W. ECKELBERG.
HAY RACK.
APPLICATION FILED JUNE 18, 1913.

1,130,498.

Patented Mar. 2, 1915.

Inventor
Wm Eckelberg

Witnesses

UNITED STATES PATENT OFFICE.

WILLIAM ECKELBERG, OF GETTYSBURG, SOUTH DAKOTA.

HAY-RACK.

1,130,498.  Specification of Letters Patent.  Patented Mar. 2, 1915.

Application filed June 18, 1913. Serial No. 774,402.

*To all whom it may concern:*

Be it known that I, WILLIAM ECKELBERG, a citizen of the United States, residing at Gettysburg, in the county of Potter and State of South Dakota, have invented certain new and useful Improvements in Hay-Racks; and I do hereby declare the following to be a full, clear, and exact description of the invention, such as will enable others skilled in the art to which it appertains to make and use the same.

This invention relates to combined feed and hay racks, and more particularly to that class of hay racks which may be converted into sleds.

One of the principal objects of my invention is to provide a hay rack which may be quickly and easily taken apart for shipment or repair.

Another object is to provide a hay rack which may quickly be converted into a sleigh.

A further object is to provide a hay rack which may be converted into a trucking wagon.

A still further object is to provide a hay rack so constructed that short sharp turns may be made.

Another object is to provide a hay rack which will be simple, durable, efficient in operation, and inexpensive to manufacture.

Figure 1:
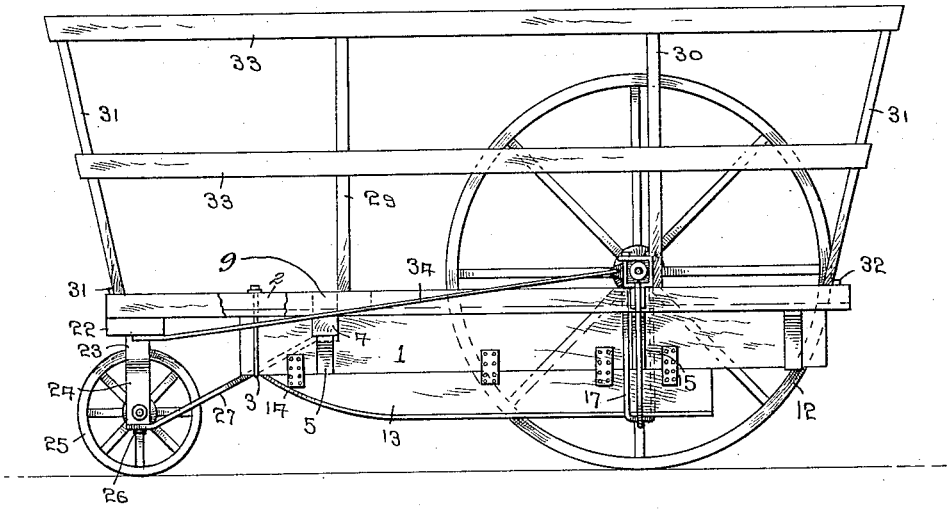
Figure 2:
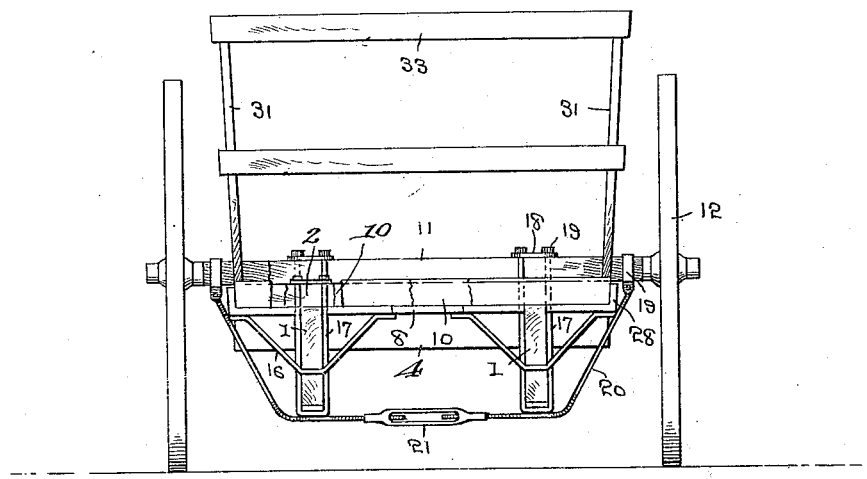

These and other objects may be attained by means of the construction, combination, and arrangement of parts, hereinafter more fully described and claimed, and illustrated in the accompanying drawings, in which like characters of reference indicate like parts throughout and in which, Figure 1, is a side elevation of one embodiment of my invention, the near wheels being removed. Fig. 2, is a rear view of the embodiment shown in Fig. 1.

In the embodiment illustrated the bed pieces 1, are formed of relatively heavy timbers secured at their front ends directly against and under the forward bed pieces 2, by means of U-bolts 3, mortised into the upper sides of the bed pieces 1, and near the front ends thereof, directly under the bed pieces 2, is a cross brace bar 4, secured to the bed pieces 1 by means of metal strips 5 passing thereunder and secured at their upper ends to the cross piece 4. The rack floor 8 is made up of boards running longitudinally of the bed pieces. A cross piece 9 is secured transversely of the floor on top of the same directly over the cross piece 4. Fastened on top of the floor toward the rear end thereof is a second cross piece 10 supporting on its upper side the axle 11, which carries on its outer ends the wheels 12. Secured to the under sides of the bed pieces 1, are runners 13 provided on their lower edges with metal strips 14. The metal strip 5, and the metal strip 15 which secure the floor to the bed pieces 1 toward the rear end thereof, pass around the under sides of the bed pieces between the same and the runners 13. A third metal brace 16, secures the floor to the bed pieces 1, at the rear ends thereof, and as shown in Fig. 2, these braces have their upper arms diverged and fastened to the under side of the floor by means of bolts or other suitable detachable means.

A pair of long U-bolts 17, pass under the runners 13, alongside the bed pieces 1 through the floor 8, and alongside the axle 10 and cross piece 11, and are provided on their upper ends with clips 18 which bear on the upper side of the axle 11 and are secured thereto by means of nuts 19 whereby the parts are firmly and detachably held together. Near the opposite ends of the axle 11, are secured rectangular clips 19, having downwardly extending lugs between which are pivoted the upper ends of angular brace rods 20, which pass down under the runners 13 and have their inner ends bent into alinement with each other and detachably secured for bracing the axle by means of the turnbuckle 21. Attached to the under side of the floor at the front end thereof, is a relatively wide cross piece 22, to which is secured a bolster 23, which is supported by a forward truck 24, carrying small front wheels 25, said truck being pivoted on the bolster by means of the king pin 26 which passes up through the truck, the bolster, the cross piece 22, and the floor. A brace strap 27 is secured to the under face of the truck above the lower head of the king pin and is bent up and has its rear end secured to the under face of the cross piece 4 centrally thereof. Secured to the ends of the cross pieces 4 and 10 and the sides of the floor 8, are side rails 28.

The basket of the rack comprises vertical uprights 29 and 30 bolted to the rear sides of the cross pieces 9 and 10 respectively; oppositely diverged uprights 31 secured at their lower ends by cross pieces 32; and the horizontal bars 33 which connect the uprights of the basket at the central and upper portions thereof. The uprights 31 may be bolted or otherwise detachably secured to the side rails 28 at the ends thereof. Truss rods 34 may have their rear ends bent around the axle near the ends thereof or may have their rear ends secured in lugs projecting from the axle as shown, and have their forward ends detachably secured by means of bolts to the opposite ends of the cross piece 22 for bracing the axle 11 and preventing any backward or forward movement of the same. The front truck is comparatively short and may be turned at a considerable angle with the bolster 23 without hindrance for making short turns. The axle 11 is longer than the ordinary axle used in hay racks, and it will be noticed that it is supported above the floor of the rack. If desirable, the basket may by reason of its being detachably secured to the body portion of the hay rack, be removed, whereby the rack may be used for trucking or other purposes.

When it is desirable to use the rack as a sleigh, the U-bolts 17 are unfastened, the angular brace rods 20 unscrewed from the turnbuckle 21, the truss rods 34 unbolted from the cross piece 22, and the axle may be removed thereby allowing the runners 13 to rest against the ground. The front truck 24 is removed and a short bob-sleigh put in its place under the bolster 23.

By the construction of my invention as thus described, it is obvious that the parts may be quickly and easily detached for shipment or repair, and when it is desired to convert the hay rack shown into a sleigh, the same may be done very quickly and easily.

Although I have described the preferred embodiments of my invention, I reserve, and may exercise the right to make such changes in the construction, combination, and arrangement of parts, as do not depart from the spirit of the invention and the scope of the appended claim.

Having thus fully described my invention what I claim as new and desire to secure by Letters-Patent is,

A hay rack providing lower bed pieces, upper bed pieces detachably secured thereto, a cross piece secured in said lower bed pieces, a floor secured on said cross piece, a second cross piece secured above said floor, an axle secured above said second cross piece, runners secured below said lower bed pieces, and U-bolts engaging said runners, lower bed pieces, floor, second said cross piece and axle, for detachably securing the same together.

In testimony whereof I have signed my name to this specification in the presence of two subscribing witnesses.

WILLIAM ECKELBERG.

Witnesses:
JAS. R. McGEE,
N. J. SCHLACHTE.

Copies of this patent may be obtained for five cents each, by addressing the "Commissioner of Patents. Washington, D. C."